(12) United States Patent
Betzer Tsilevich

(10) Patent No.: US 7,694,736 B2
(45) Date of Patent: *Apr. 13, 2010

(54) INTEGRATED SYSTEM AND METHOD FOR STEAM-ASSISTED GRAVITY DRAINAGE (SAGD)-HEAVY OIL PRODUCTION TO PRODUCE SUPER-HEATED STEAM WITHOUT LIQUID WASTE DISCHARGE

(76) Inventor: Maoz Betzer Tsilevich, 640 Woodbine Blvd., Woodbine, Southwest Calgary, Alberta (CA) T2W 4W4

(*) Notice: Subject to any disclaimer, the term of this patent is extended or adjusted under 35 U.S.C. 154(b) by 0 days.

This patent is subject to a terminal disclaimer.

(21) Appl. No.: 12/119,356

(22) Filed: May 12, 2008

(65) Prior Publication Data

US 2008/0289822 A1 Nov. 27, 2008

Related U.S. Application Data

(63) Continuation-in-part of application No. 11/752,813, filed on May 23, 2007.

(51) Int. Cl.
*E21B 43/24* (2006.01)

(52) U.S. Cl. ............ 166/272.3; 166/75.12; 166/267; 166/403

(58) Field of Classification Search .............. None
See application file for complete search history.

(56) References Cited

U.S. PATENT DOCUMENTS

| | | | | |
|---|---|---|---|---|
| 5,607,577 A | * | 3/1997 | Koszarycz et al. | 208/391 |
| 2006/0243448 A1 | * | 11/2006 | Kresnyak et al. | 166/303 |

* cited by examiner

*Primary Examiner*—Zakiya W. Bates
(74) *Attorney, Agent, or Firm*—Egbert Law Offices PLLC

(57) ABSTRACT

A method and system for producing steam for extraction of heavy bitumen including the steps of mixing carbon or hydrocarbon fuel. The fuel is crude oil, vacuum residue, asphaltin, petcoke or coal. The oxidation gas includes oxygen, oxygen enriched air or air-combustion of the mixture under high pressure and high temperature. The fuel is mixed with low quality contaminated water containing organics and inorganics. The liquid phase transferred to a gas phase includes steam and carbon dioxide, wherein solids are separated from the gas phase. The gas phase is mixed with saturated water to scrub the remaining solids and produce saturated steam. The solid rich water is recycled back for combustion. The saturated steam super-heated dry steam and gas mixture is send to an enhanced oil recovery facility for injection into an underground reservoir.

20 Claims, 6 Drawing Sheets

INTEGRATED SYSTEM AND METHOD FOR STEAM-ASSISTED GRAVITY DRAINAGE (SAGD)-HEAVY OIL PRODUCTION TO PRODUCE SUPER-HEATED STEAM WITHOUT LIQUID WASTE DISCHARGE

CROSS-REFERENCE TO RELATED U.S. APPLICATIONS

The present application is a continuation-in-part of U.S. application Ser. No. 11/752,813, filed on May 23, 2007, and entitled "Integrated System and Method for Steam-Assisted Gravity Drainage (SAGD)-Heavy Oil Production Using Low Quality Fuel and Low Quality Water", presently pending.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

This application relates to a system and method that improves the Steam-Assisted Gravity Drainage (SAGD) facility or other Enhanced Oil Recovery (EOR) facilities with a system that can be integrated into an existing facility or be used as a new stand-alone facility. The present invention relates to processes for producing steam from low quality rejected water containing high levels of dissolved and suspended inorganic solids or organics, such as oil.

With its simple direct contact, above ground adiabatic nature, and its high pressure and temperature solid removal, this invention will minimize the amount of energy used to produce the mixture of steam and gas injected into the underground formation to recover heavy oil. This thermal efficiency minimizes the amount of greenhouse gases released into the atmosphere.

This thermal efficiency is achieved due to direct heat exchange. The condensed steam and the gases that will return back to the surface with the produced bitumen are at the underground reservoir temperature, which is no higher than the temperature required for oil recovery. The produced water does not need to be cooled to be treated in a water treatment facility as the produced hot contaminated water can be used for steam production without any additional treatment. (See "Alternative Energy Source" by Rosalynn J. MacGregor in Hydrocarbon Processing, July 2007, discussing the significance of the SAGD produced water cooling requirement on a SAGD facility heat balance and the heat losses that result in greenhouse gas (GHG) emissions.)

The above-mentioned invention also relates to processes for making SAGD facilities or other EOR facilities more environmentally friendly by using low quality fuel and reducing the amount of greenhouse gas emissions through thermal efficiency and injecting the $CO_2$ into the underground formation, where a portion will remain permanently.

2. Description of Related Art Including Information Disclosed Under 37 CFR 1.97 and 37 CFR 1.98.

Steam injection into deep underground formations has proven to be an effective method for EOR facilities producing heavy oil. This is typically done by SAGD or by Cyclic Steam Stimulation (CSS), also known as "huff and puff". In recent years, the SAGD method has become more popular, especially for heavy oil sand formations. Presently, steam injection is the only method commercially used on a large scale for recovering oil from oil sands formations.

The invention can be used together with prior art processes being used in upstream and downstream production facilities, currently in use by the oil Industry. The present invention adds the adiabatic direct contact steam and carbon dioxide generation unit to reduce the disadvantages of the prior art and to allow for expansion with use of a low quality water supply, reject water from existing facilities and the use of low quality fuel supplies. Also, there is no need for high quality separation of the oil from the produced water and water purification processes with this invention. The present invention is a Zero Liquid Discharged (ZLD) system because solid waste is produced instead of liquid waste.

In the present invention, the exothermic reactions and treatment of the injected gas mixture are done in an adiabatic control area above ground. The underground portion of oil production is very complex, with many unknowns, because the oil formed over millions of years until it reached steady-state equilibrium. As shown in other areas, one way to exploit resources and produce products is by improving processes control. Since underground combustion processes change the chemistry of the reservoir, they further complicate the complex underground reservoirs and are difficult processes to control.

The injection of pure steam, or steam in a mixture with other gases, creates the minimum necessary increase in the underground formation disorder. It does not increase the complexity of the underground reservoir beyond the minimum required to mobilize oil from the sand. This may be the reason why only the processes of steam-injection (or of steam and other gases), are implemented and found to be commercially effective with SAGD.

The present invention is to be used with EOR methods, mainly SAGD. The main disadvantages of existing commercial SAGD(s) are the main drivers of the present invention.

SAGD, CSS and similar EOR facilities, consume large quantities of water to extract the heavy oil by using steam. The water-to-oil ratio needed to extract the oil from the ground is about 2-4 barrels of water to one barrel of oil. The current prior art technologies require relatively high water quality, as required by the Once-Through Steam Generators (OTSGs) or boilers for scaling prevention. This results in expensive water treatment plants with water de-oiling separation. The operations of such facilities consume chemicals to minimize oil traces in the recycled water. Reject water is produced and injected into disposal wells. In the case of lime softeners, sludge is produced as well. The purification processes can create sludge (as is the case with lime softeners) and reject wastewater. Where disposal wells are not permitted for environmental reasons, an additional expensive and energy consuming ZLD system is added to evaporate the reject water to produce solid waste. As part of the recycled water treatment, all oil traces must be removed. These stringent requirements are applicable in both prior-art commercial technologies, lime softeners and in evaporator-based facilities. Any oily emulsions must be broken down by chemicals or filters to a very high degree of separation. The process usually produces a stream of "reject water" from the blow-down that is injected into disposal wells or treated in an additional, expensive and energy consuming ZLD facility, including evaporators and crystallizers. Low quality, high Total Suspended Solids (TSS) and Total Dissolved Solids (TDS) source water requires an expansive treatment facility, and using lime softeners creates large amounts of sludge. As a result the oil sands producing companies are typically drawing relatively high aquifers to produce the best water quality available from an area, which is typically a much larger area than the area in which the oil is produced.

An ongoing portion of the EOR construction and operation costs is the cost of constructing and operating the water treatment plant. At present, the most widespread commercial water treatment process in the SAGD industry is the use of lime softeners. In this process, lime, magnesium oxide and other materials are used to remove dissolved solids from the water in the form of slurry. This process requires constant chemical supply and creates significant amounts of slurry waste, resulting in landfill costs and environmental impacts. Different processes include evaporators that require water de-oiling and reject water that must be disposed of in disposal wells, or evaporated and crystallized to produce solid waste in additional ZLD facilities. (See "Use of Evaporation for Heavy Oil Produced Water Treatment", by W. Heins and D. Peterson, Journal of Canadian Petroleum Technology, 2005, vol. 44, pp. 26-30.) There is a need for the ability to use oily water and water-oil emulsions in the production of steam so as to reduce the complexity of water treatment and associated capital costs. As well, it is necessary to do so in order to reduce the amount of energy and chemicals used. There is an advantage to producing dry solid waste that is easy to dispose of.

EOR facilities, like SAGD, consume a large amount of heat energy. In most commercial SAGDs, natural gas is used as the energy source for steam production. Natural gas is a valuable resource. The extensive use of natural gas for producing oil is expensive with significant environmental impacts. In some prior art projects, steam is produced by burning some of the extracted heavy oil for the production of steam. This is a problematic process since there is a need for flue gas treatment prior to releasing it into the atmosphere. Another option is to combine upstream and downstream technologies in the form of an SAGD and an Upgrader that uses a gasification process to gasify the "barrel bottom" to produce syngas for the production of steam in non-direct steam generators. There is a need to use heavy oil upgrading by-products for steam production.

The SAGD technology consumes a significant amount of energy to produce the steam for SAGD facilities. The use of OTSG, boilers or gas turbines to generate steam causes only a portion of the heat from the burning hydrocarbon to be injected underground into the reservoir. Hot flue gases with carbon dioxide are released to the atmosphere. A typical SAGD that produces 50,000 bitumen barrels per day generates 4,000 ton to 8,000 ton of carbon dioxide per day. There is a need to minimize the carbon dioxide release. This can be achieved by: (1) using less steam; (2) producing the steam in a more efficient manner, (so as to minimize aboveground heat losses); and (3) injecting the carbon dioxide with the produced steam to the reservoir; where some of it will permanently remain.

Various patents have been issued that are relevant to this invention. For example, U.S. Pat. No. 4,498,542, issued on Feb. 12, 1985 to Eisenhawer et al., describes a system for above-ground direct contact steam generation. The method and apparatus produce a high-pressure mixture of steam and combustion gases for thermal stimulation of petroleum wells. The produced mixture of combustion products, such as steam and water, is separated to gas and liquid phase in a separator where the gas and steam mixture is injected to create enhanced oil recovery. The liquid water is flashed to produce additional steam. The concentration of solids increases downstream from the combustion in the separator and flash chamber where they are continually removed with disposed, drained water. The drained water's heat energy is reused in this process. The generated steam in the saturated condition will create corrosion problems and will require additional steps to be taken.

U.S. Pat. No. 4,398,604, issued on Aug. 16, 1983 to Krajicek et al., describes a system for above-ground stationary in direct contact horizontal steam generation. The method and apparatus produce high pressure, a thermal water vapor stream, and a stream of combustion gases for recovering heavy viscous petroleum from a subterranean formation. These high-pressure combustion gases are directed into a partially water-filled vapor generator vessel used to produce a high-pressure stream of water vapor and combustion gases. The generated solids are continually removed with reject water.

There are also patents related to applications in down-hole heavy oil production. U.S. Pat. No. 4,463,803, issued to Wyatt on Aug. 7, 1984 describes a system for down-hole stationary direct contact steam generation for enhanced heavy oil production. The method and apparatus generate high-pressure steam within a well bore. The steam vapor generator is used for receiving and mixing high-pressure water, fuel and oxidant in a down-hole configuration. The produced solids are discharged to the reservoir. Generally, the down-hole direct contact steam generators of the prior art have some debilitating disadvantages. Any maintenance is complicated, and requires the well to shut down, while a drilling completion rig is necessary to pull out the equipment. The water and fuel that is used must be of the highest quality so as to prevent the creation of solids that plug up the well over time. Any operation outside of optimal design conditions can lead to corrosion and solid carbon problems.

The above-ground prior art methods and systems typically generate reject water that can be either released to a disposal formation or crystallized in a separate facility, where the remaining water is evaporated. The steam and carbon mixture produced by the prior art can easily lead to corrosion, due to condensation. The prior art also requires a liquid-solid separation process.

It is a goal of the present invention to provide a system and method to improve EOR facilities like SAGD, through a supply of steam and gas mixtures for underground injection wells and also by creating add-ons to existing facilities.

It is another objective of the present invention to provide a system and method that can produce steam from low quality rejected water containing high levels of TDS and TSS, like high levels of non-dissolved inorganic solids or organics.

Another objective of the invention is to provide a system and method that utilizes low-grade fuel.

An additional objective of the present invention is to provide a system and method that will remove produced solids by converting the liquids to gas phase under high pressures and will remove solids from the gas phase.

Furthermore, it is another objective of the present invention to provide a system and method that enhances thermal efficiency as a result of direct heat exchange, which minimizes the amount of energy used to produce the mixture of steam and gas injected into the underground formation to recover heavy oil.

It is a further objective of the present invention to provide a system and method that minimizes the amount of greenhouse gases that are released out into the atmosphere.

A further purpose of the present invention to provide a system and method that serve to make EOR facilities, like SAGD, more environmentally friendly by using low quality fuel and reducing the harmful effects of greenhouse gases.

An additional goal of the present invention is to provide a system and method, which minimizes water treatment costs.

It is still a further object of the present invention to provide a method for steam production and gas mixing for extraction of heavy bitumen.

It is an object of the present invention to provide a method for producing super-heated, dry, solid-free steam and gas mixture flow being between 800 and 4000 Kpa and in temperature of between 170° C. and 450° C.

It is still a further object of the present invention to provide a method that uses disposal water, possibly with oil, clay or silica sand from a SAGD facility.

It is still a further object of the present invention to provide a system for oil recovery using heat injection.

These and other objects and advantages of the present invention will become apparent from a reading of the attached specification and appended claims.

BRIEF SUMMARY OF THE INVENTION

The method and system of the present invention for steam production for extraction of heavy bitumen includes the following steps: (1) mixing a low quality fuel containing at least heavy bitumen, solid hydrocarbons or carbons emulsion and oxidizing gas like oxygen, enriched air or air; (2) combusting the mixture under high-pressure and temperature; and (3) mixing water, possibly with high total dissolved and suspended solids content (like silica, calcium, magnesium, sodium, carbonate or organics) within the combusted mixture so as to control reactor temperature and generate steam.

The method of combustion includes transferring the liquid phase to a gas phase, and separating the solids from the gas phase adiabatically in order to keep the gas at the high temperature. The gas phase contains steam, carbon dioxide and possibly other gases that were present at the oxidizer or generated from the fuel used. The gas and steam are cleaned in a separator and then they are mixed with liquid water of high saturated temperature and pressure so as to produce saturated clean wet steam, and any remaining solids are scrubbed from the gas. The liquid water is then separated from the gas. In the event that the gas contains sulfur, and in the event that there is a requirement to remove the sulfur in the produce steam and gas mixture prior to the injection to the underground formation, the process can include adding lime, possibly with dolomite, and magnesium oxide during the step of scrubbing and then reacting the lime with the sulfur.

The liquid phase and the remaining solids are recycled and moved back, with liquid water, to the combustion chamber. The liquid phase and remaining solids are heated in the combustion reactor so as to gasify the liquid phase and remove the remaining solids. Corrosive contaminant gases can be removed from the gas phase by commercially available packages designed for specific gas composition on specific locations. The pressure of the clean, saturated wet steam is reduced to an injection pressure that will transfer the steam from a saturated wet phase to a dry phase. Heat can be added to the steam to produce yet a higher temperature of super-heated dry steam and gas mixture. The pressure of the dry steam and gas mixture is between 800 and 4000 Kpa. The temperature of the steam and gas mixture will be between 170° C. and 300° C. A heat exchanger can be added in-between the hot gases, leaving the combustion chamber and the produced gases for injection. The temperature of the produced super-heated dry steam and gas mixture can be up to 450° C. High temperature is necessary to prevent condensation and corrosion due to the presence of carbon dioxide and other gases like sulfur dioxide in the steam and gas mixture.

The super-heated dry steam and gas mixture can be injected into an underground reservoir through a prior art commercially used EOR facilities like SAGD horizontal injection well, or by CSS vertical injection wells.

The disposed water delivered from an existing EOR-like SAGD facility can be used as the low quality water needed for the above method. Similarly, the extracted heavy bitumen can be received from the SAGD facility without processing in-between. Fuel for the combustion process can be supplied from a remote Upgrader in the form of slurry, using the Upgrader reject water. The fuel used in this method can be petcoke, untreated "green" petcoke (that is, removed from the delay cokers with out any additional processing or asphaltin). Explicitly, this solid fuel is transported in the form of slurry mixed with low quality water. It is pumped into a direct contact steam generator, where it is injected to a combustion chamber along with some of the transportation water. A portion of the water can be recycled, and sent back to be used again as the solid fuel transportation medium, together with fresh, continuously added make-up water.

DETAILED DESCRIPTION OF THE INVENTION

Figure 1:
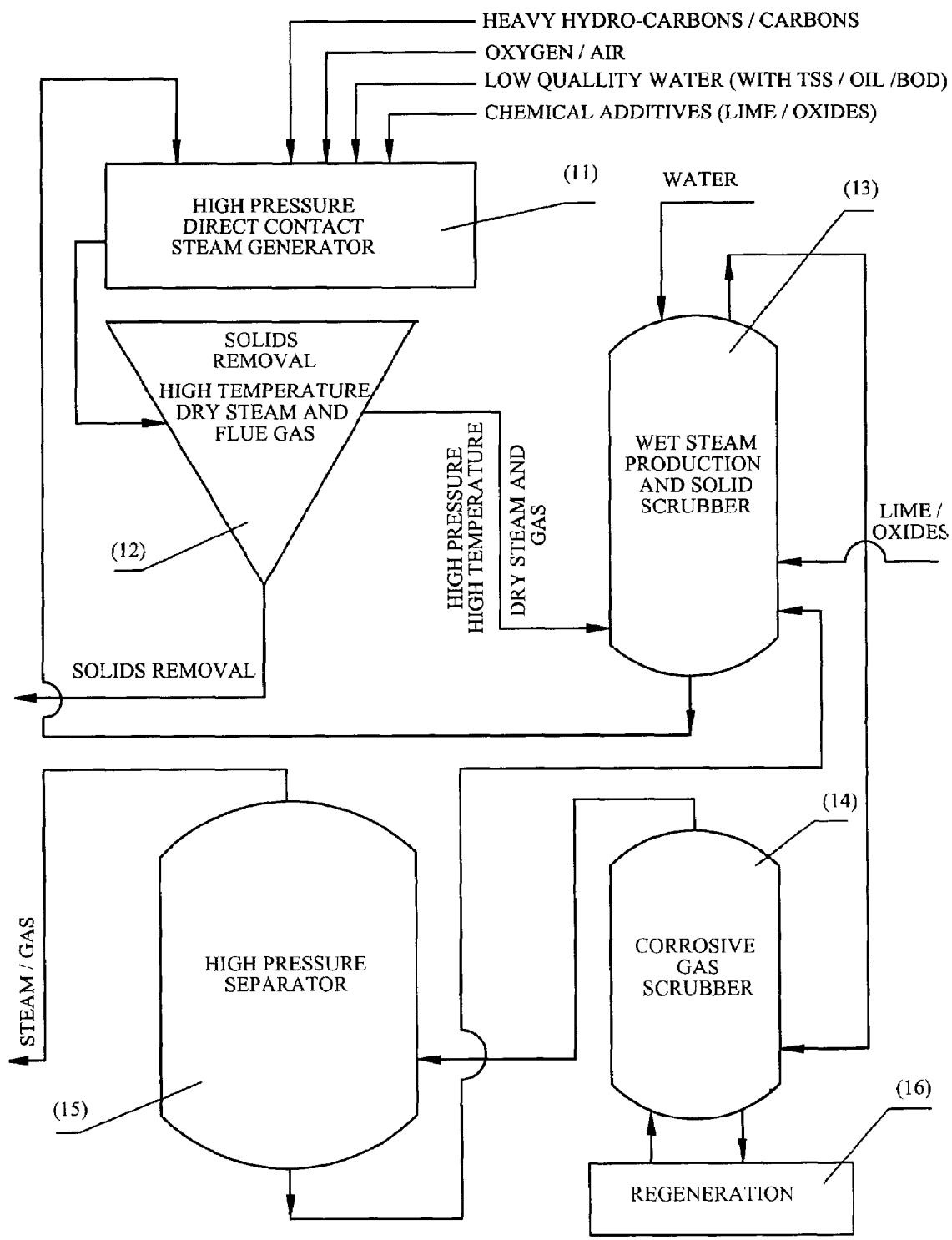
FIG. 1 is a schematic view of an illustration of the current invention for Zero Liquid Discharge (ZLD) direct contact steam generation with solids removal.

FIG. 1 shows an embodiment of the present invention, wherein hydrocarbons, like untreated, heavy, low-quality crude oil, vacuum residue (VR), coal, asphaltin or petcoke if available from an oil upgrading process, are injected together with oxidation gas (oxygen, air or enriched air) to the combustion area of a high-pressure Direct Contact Steam Generator 11. Heat is released from the exothermic reaction. Water is injected to the combustion area 11 to keep the high temperature under control, preventing damage to the facility while achieving full oxidation reaction of the carbon to minimize the amount of unburned carbon solids. An additional water is injected to produce steam. The amount of water is controlled to produce steam, where all the liquids amid the soluble materials become solids and all liquids evaporate or combust to gas and solid slug and ash. Additional chemical materials can be added to the reaction. For example, limestone can be added to water in a situation where the fuel used is rich in sulfur. The gas and solids move to a high-pressure solid separation block 12 where the solid phase is removed from the gas phase. This can done in a continuous way or at intervals combined with pressure drops.

The high pressure, high temperature gas is mixed and washed throughout the water in the partially filled vessel 13 to remove the remaining solids and to produce wet steam. The rejected water and solids from the block are injected back into the steam generator 12. In a case where the water or the fuel include a high percentage of impurities that react to produce unacceptable corrosive materials (high chlorine, sulfur etc), an additional reaction block for corrosion control is added. The wet steam is injected into a high-pressure, high-temperature, corrosive gas scrubber. At 14, the water is circulated and re-generated and at 16 the remaining corrosive gases are removed. This exact scrubbing and re-generation of the injected steam-gas mixture is chosen according to the impurities that appear in the water and the oil at the specific site. Those units are commercially available. It is important to emphasize that purification treatment at this stage is not designed to allow the release of the gases to the atmosphere (which requires removal of most contaminants) but only to maintain the corrosive product at an acceptable level relative to the facility design. For instance, there is no need for a block in a case where stainless steel is being used for piping and casing, even if the fuel and water feeds are heavily polluted.

The steam and gas mixture flows to a high-pressure separator block 15 where the steam and reaction gases are separated from the liquids and readied for injection into the reservoir. The separated liquid phase is injected back to the wet steam production vessel 13 and from it to the steam generator 11.

Figure 2:
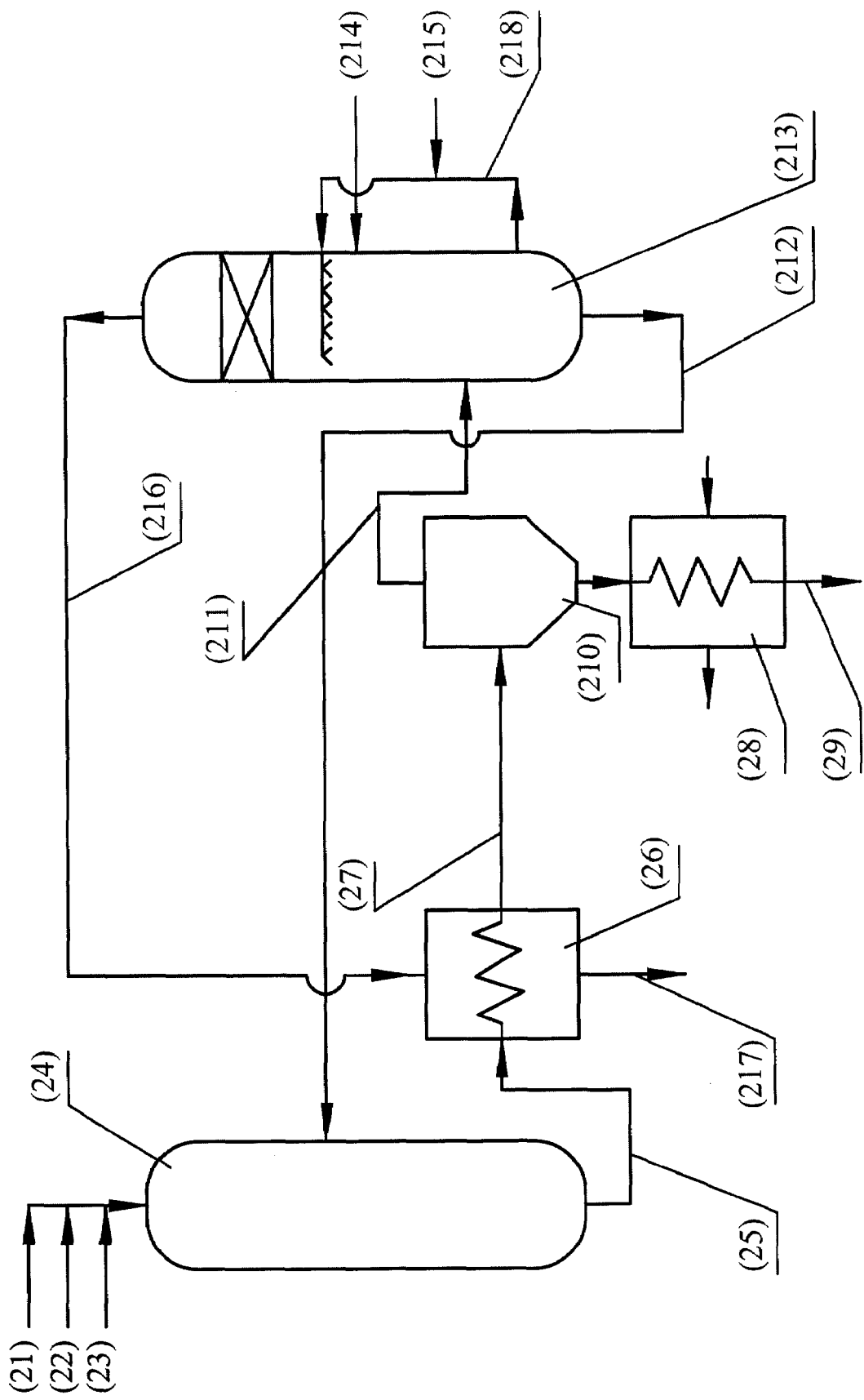
FIG. 2 is a schematic view of an illustration of a ZLD direct contact super-heated steam generator, for the production of a super heated steam/gas mixture for heavy oil recovery

FIG. 2 shows a schematic visual illustration of a ZLD direct contact super-heated steam generator for the production of a super-heated steam and gas mixture for oil recovery.

Fuel, possible in slurry form, 21, oxidizer 22, like oxygen enriched air, and water 23, are injected into the high-pressure steam generation reactor 24. The pressure in the steam generator reactor is 800 kpa-10000 kpa, preferably in the range of 300 kpa-400 kpa. The temperature in the combustion reaction area is 900° C.-2500°, preferably in the range of 1100° C.-1800° C. in most of the reaction area. Low quality water that contains high concentrations of solids can reach beyond 50,000 ppm TDS, TSS (i.e.—silica, sand, clay, $CaCO_3$, gypsum in slurry form) and organics 212 are injected to the vessel to the boundaries of the combustion reaction zone where they generate steam while reducing the temperature to solidify the created slug, if slug is generated. This low quality water that is injected separately from the burner is not supposed to reduce the combustion zone temperature but should generate steam, protect the structure of the steam generator and prevent melted soot particles from sticking to the internal elements.

The generated gas, steam and solids 25 leave from vessel 24 at a temperature in the range of 300° C.-800° C., more preferably in the range of 350° C.-600° C. The produced gas and steam flows through heat exchanger 26 where some of the heat is transferred to the produced flow of superheated dry steam/gas mixture 217. The gas-solids mixture flows through line 27 to solid separation unit 210. The solid separation is a unit that is commercially available, and can include cyclonic separators, centrifugal separators, mesh separators or any combination technologies. The solids discharge from separator 210 can flow through heat exchange 28 to recover heat for pre-heated process flows. The solids discharged from the process through line 29 can be disposed of in a landfill or through any other disposal method. The lean solids gas-steam mixture 211 leaves the separator and is injected into vessel 213. The gas-steam mixture released heat to the liquid saturated water in the vessel, converts water to steam.

Vessel 213 is maintained at high pressure, about 800 kpa-10000 kpa, preferably in the range of 3000 kpa-4000 kpa, (slightly less than the pressure at the steam reactor). The vessel is partially filled with water at saturated vapor pressure and temperature. Steam is continually produced in vessel 213 and the remaining solids are washed form the injected steam and gas mixture 212 by the water. Fresh make-up water 218 is continually injected to the vessel to maintain the scrubbing liquid water level. To increase the heat transfer and steam generation capacity, saturated liquid water can be circulated 215. Limestone together with Dolomite, magnesium oxide or other additives 215 can be injected to vessel 213 in slurry form. Because the solids are water-scrubbed and water continually converted to steam, solid-rich reject water is continually removed from the bottom of the vessel to control the solid concentration level in the liquid water of vessel 213. The rejected water 212 that contains scrubbed fly solids, any remaining Limestone, gypsum (generated from the reaction of the lime with sulfur) and any other dissolve solids are recycled back to steam generation reactor 24. The vessel produces saturated, clean, wet steam and gas mixture 216. The wet steam flows through heat exchanger 26. It is heated by stream flow 25 leaving the reactor 24 and becomes a super-heated dry steam and gas mixture at 217. The pressure of said mixture is in the range of 800 kpa-3500 kpa depending on the specific EOR facility requirements. The temperature can be in the range of 250° C. -450° C. These dry, high temperature and pressure products can be injected into underground formation to enhance oil recovery while minimizing corrosion problems due to condensation in the steel pipes.

Figure 3:
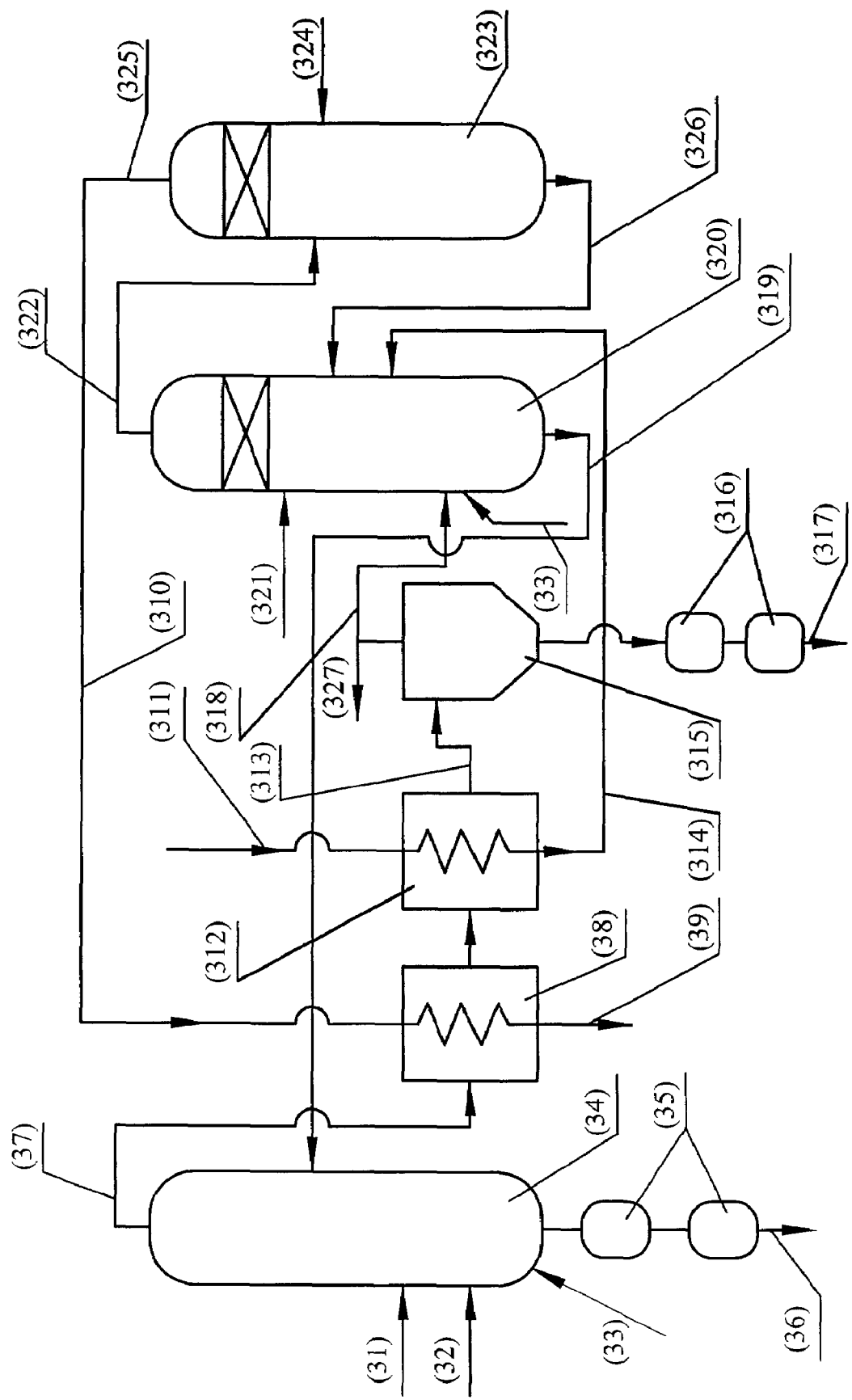
FIG. 3 is a schematic view of an illustration of a ZLD direct contact super heated steam generator with partial combustion in the steam generation reactor, solids removal from the combusting vessel and two steam generators, solids scrubbing and separation vessels.

FIG. 3 shows a schematic visual illustration of a ZLD direct contact super heated steam generator for the production of a super-heated steam/gas mixture for oil recovery with partial combustion in the steam generation reactor.

Fuel, possibly in slurry form 32, oxidizer 33, possibly oxygen-enriched air, and water 31, are injected to fluid bed high pressure steam generation reactor 34. The pressure in the steam generator reactor is in the range of 800 kpa-10000 kpa, preferably in the range of 200 kpa-400 kpa. The temperature in the combustion reaction area is in the range of 600° C. -1300° C., preferably in the range of 800° C.-1200° C. within most of the reaction area. For temperature control and for the production of Syngas Synthesis Gas by-product the reactor can operate in a partial combustion mode where less heat is generated while generating carbon monoxide and hydrogen that will be combusted later in the process. A possible advantage in using partial combustion in the invention is a reduction of the heat flex and combustion temperature in the combusting reactor 34, while producing Synthesis Gas that part of it 327 can be used for other processes (like hydrogen production), after further processing in a commercially-available Syngas processing unit. The rest of the hot Syngas 318, after being cleaned from the fly solids in separator 315, is injected together with the oxidizer 33 to vessel 320 while generating additional heat. A possible drawback in the partial combustion use is the additional complication and the generation of carbon particle solids, especially when the fuel in use is high mineral coal and the reaction temperature is in the lower range. Another disadvantage is toxicity of the produced Syngas, because it contains Carbon monoxide and Hydrogen sulfide (which are generated from the sulfuric fuel and the oxygen starvation conditions). Toxicity complicates solids removal 317.

The gases and fly solids flow from the top of vessel 37. The discharge temperature is in the range of 350° C. -700° C., preferably in the range of 400° C. -500° C. Solids can be discharged from the bottom of reaction vessel 34 through de-pressurizing containers and the valve system at 35.

The produced gas and steam flows through heat exchanger 38, where some heat is transferred to produce superheated dry steam/gas mixture for injection 39. The gas-solids flow to an additional heat exchanger 312 where they deliver heat to pre-heat the supplied water. The heated supplied water 311 injected to vessel 320. The steam and gas mixture 313 temperature drops to approximately 250° C. -400° C. Stream 313 flows to a solid separation unit 315, a commercially available package unit that can include cyclonic separators, centrifugal separators, mesh separators or any combination of gas-solid separation technologies. The solids discharged from separator 315 are discharged through a system of at least two vessels and valves in row 316 to de-pressurize the solids discharged. The solids 317 can be disposed in a landfill or through other disposal methods. The lean solids gas-steam mixture 318 leaves the separator from the upper section and is injected into the first scrubbing and steam generation vessel (320). Vessel 320 is maintained at high pressure 800 kpa-10000 kpa, preferably in the range of 2000 kpa-4000 kpa, slightly less than the pressure of the steam reactor. The vessel is partially filled with water at the saturated vapor temperature and temperature. The water washes the remaining solids. Steam is continually produced in vessel 320. Pre-heated, fresh, make-up water 314 is continually injected to vessel 320 to maintain the scrubbing liquid level.

Chemicals like Limestone, magnesium oxide or other materials 321 can be injected to vessel 320 in slurry form. Because water scrubbed the solids and continually converted to steam, solid-concentrated reject water 319 is continually removed from the bottom of vessel 320. The rejected water 319 Containing scrubbed fly solids, Limestone, generated gypsum and any other dissolve solids is recycled back to steam generation reactor 34. The vessel produces a saturated, clean, wet, steam and gas mixture 322. The wet steam flows to vessel 323 where additional scrubbing water and slurry like Limestone, magnesium oxide or other materials can be injected 324. The saturated steam and gas phase is separated from the liquid phase. The water with remaining materials recycled from the bottom of vessel 323 to the previous vessel 320. The saturated wet steam and gas mixture 325 is separated and released from the top of vessel 323. The wet saturated gas and vapor mixture 325 is heated in heat exchanger 38 by stream 37, leaving reactor 34 to become a super-heated, dry steam and gas mixture 39. These dry, high temperature and pressure products can be injected into underground formation for enhanced oil recovery while minimizing the problems of corrosion.

Figure 4:
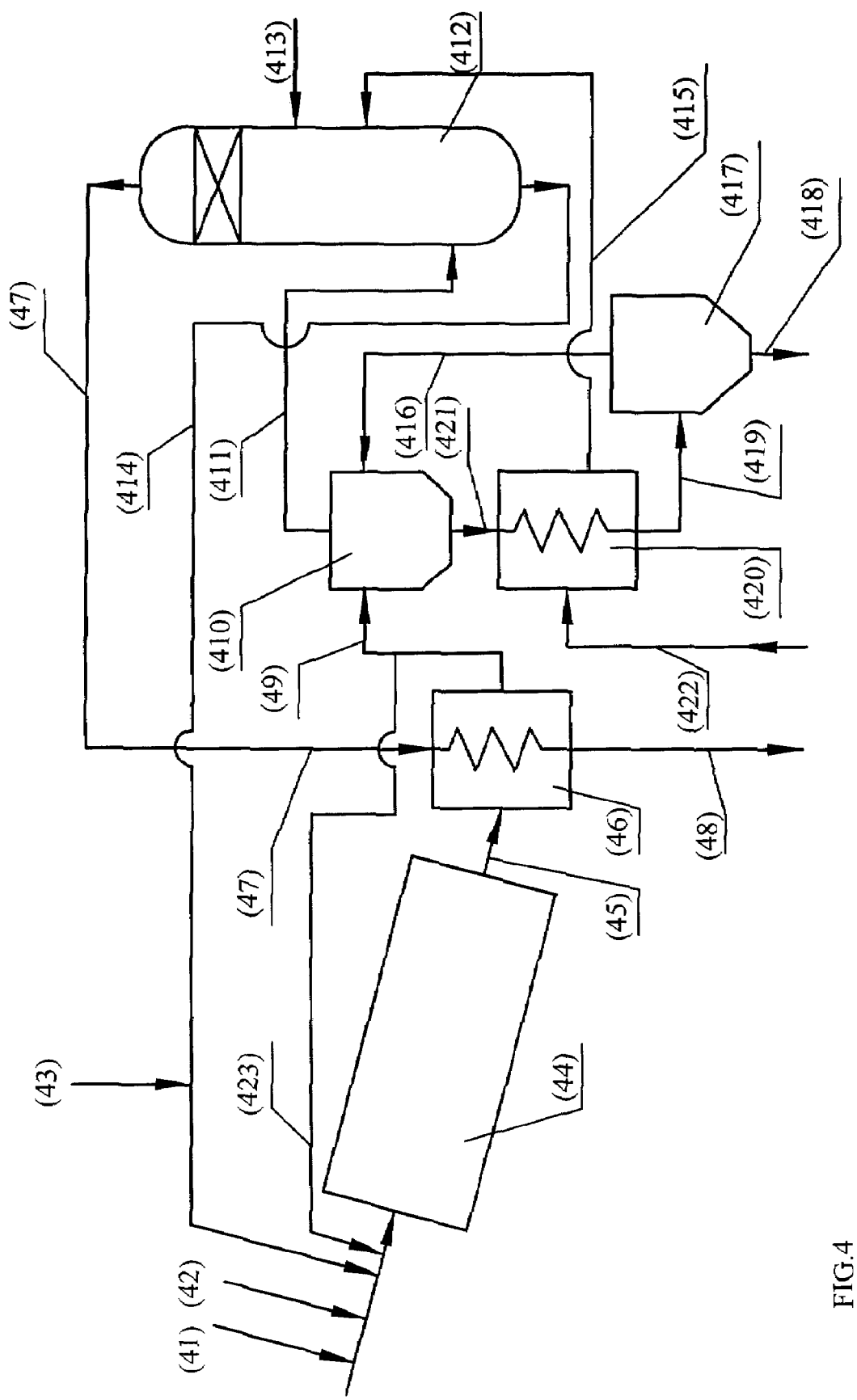
FIG. 4 is a schematic view of an illustration of a ZLD direct contact super-heated vertical steam generator with steam and gas recycle for combustion temperature control.

FIG. 4 shows a schematic visual illustration of a ZLD direct contact super-heated vertical steam generator with gas recycle for combustion temperature control for the production of steam and gas mixture for oil recovery.

Fuel, possibly in slurry form, 41, oxidizer 42, like oxygen, oxygen-enriched air, or air and water 43, are injected to a high-pressure vertical steam generation reactor 44. The pressure in the steam generator reactor is in the range of 800 kpa-10000 kpa, preferably in the range of 2000 kpa-4000 kpa. The temperature in the combustion reaction area is in the range of 900° C.-2500° C., preferably in the range of 1100° C. -1800° C. within most of the combustion reaction area. Low quality water, possibly with organics and inorganic contamination 43, is injected to the vessel to generate steam while controlling the internal temperature.

The gases and solids are discharged from the opposite side of the vessel 45. The discharge temperature is in the range of 300° C. -800° C., more preferably in the range of 300° C.-500° C.

The produced gas and steam flows through heat exchanger 46 where some of the heat is transferred to the stream of the clean gas and saturated steam 47. The temperature of the steam and gas mixture 49 dropped to 300° C. -450° C. For combustion control in the steam generation reactor 44, a portion of the produced cooler steam and gas mixture 49 can be recycled back 423 and circulated in reactor 44.

Stream 49 flows to a solid separation unit 410. The rich solid discharge from separator 410 flows through heat exchanged 420 to recover heat, in order to pre-heat the water supplied to process 422. The discharged flow 419, flow to an additional gas-solid separator 417. The lean solids gas stream flows back to separator 410 and the solids 418 are removed for disposal in a land-fill or through other disposal methods. The lean solid gas-steam mixture 411 flows from the upper section of separator 410 and is injected into solid scrubbing and steam generator vessel 412.

Vessel 412 is maintained at high pressure of 800 kpa-10000 kpa, preferably at 3000 kpa-4000 kpa, at a pressure slightly less than the pressure of the steam reactor 44. The vessel is partially filled with liquid water at the saturated vapor temperature. Steam is continually produced in vessel 412, where the remaining solids are washed by the water phase. Pre-heated, fresh, make-up water 415 is continually injected to vessel 412 to maintain scrubbing liquid level. Chemicals like limestone, magnesium oxide or other materials 413 can be injected to the vessel 412 in slurry form. Because water scrubbed the solids and continually converted them to steam, reject water rich in solids 414 is continually discharged from the bottom of vessel 412. The rejected water at 414 contains scrubbed fly solids, remaining limestone, generated gypsum and other dissolve solids. This is recycled back to steam generation reactor 44. Vessel 412 produces a saturated, clean, wet steam and gas mixture 47. The wet saturated gas and vapor stream 47 is then heated in heat exchanger 46 by stream 45, leaving reactor 44 to become super-heated dry steam and gas mixture 48 in a temperature of 200° C. -300° C. and injection pressure. This dry, high temperature and pressure product can be injected into underground formation for enhanced oil recovery while minimizing corrosion problems.

Figure 5:
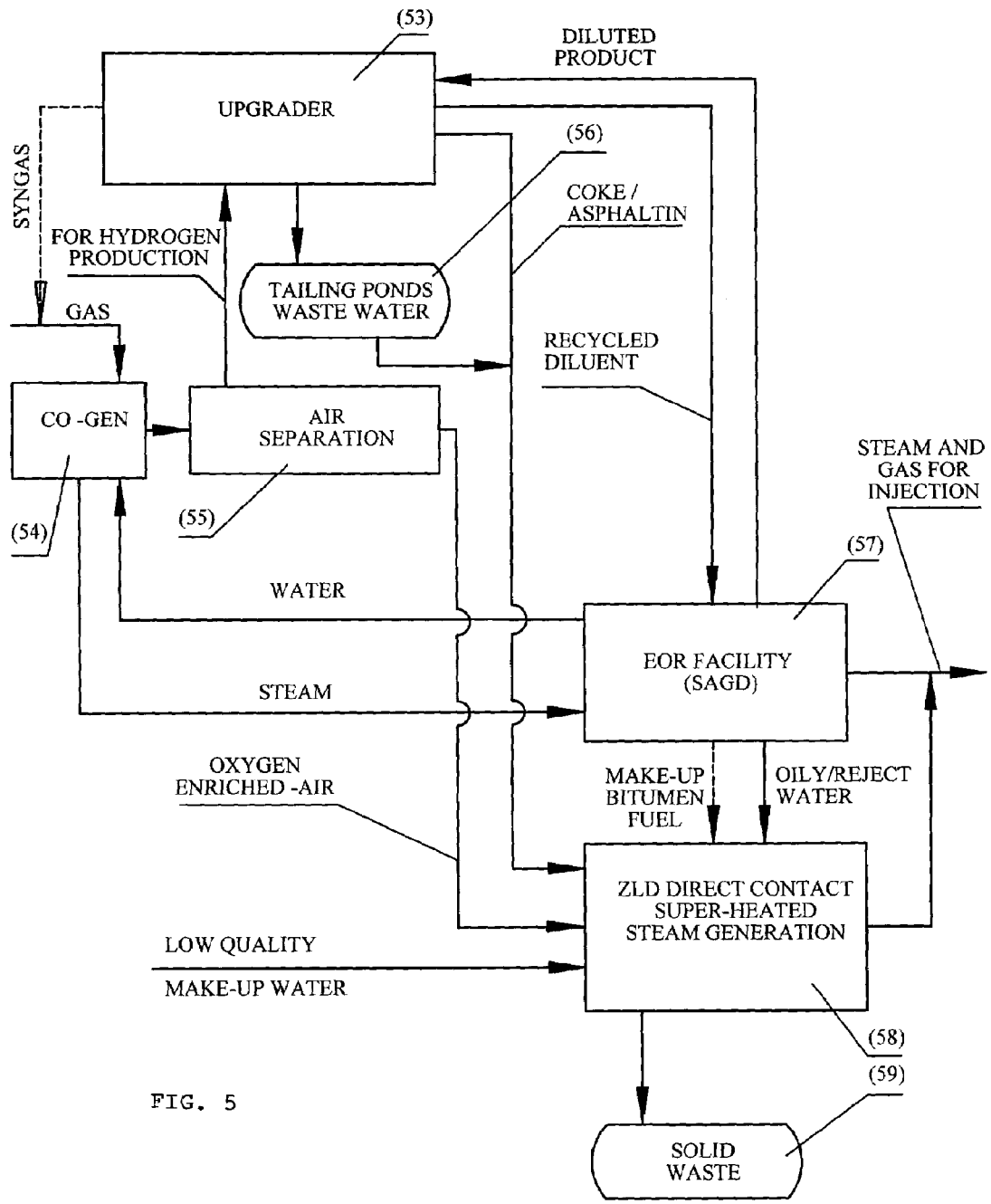
FIG. 5 is a block diagram showing the integration of the direct contact super-heated steam generation facility of the present invention with a prior art Upgrader, a co-generation facility, air separation facility and a prior art EOR facility.

FIG. 5 is a block diagram showing the integration of the ZLD direct contact super-heated steam generator, described previously in FIGS. 1-4, with an Upgrader, a co-generation facility, air separation facility and EOR facility that includes a water treatment plant with indirect steam generation equipment. The method described in FIG. 5 can also be applied to a facility that does not include prior art indirect steam generation or Co-gen as a power source for an air separation unit.

An Upgrader 53 produces solid fuel that has minimal or no commercial value, like "green" petcoke from delay cokers. Any other type of carbon fuel like petcoke, asphaltin and similar by-products can be used as well. The Upgrader produces wastewater contaminated with fine inorganic materials like silica sand, clay, dissolved salts, metals and also organic contaminants. The Upgrader's wastewater is maintained in tailing pond 56. The solid fuel waste produced by the Upgrader is ground to grains less than six millimeters in size.

These are then mixed with the low quality tailing water. Next, the slurry mixture is pumped through a pipeline, to a ZLD direct-contact super heated steam generator 58 where it is injected to the direct-contact high-pressure steam generator, along with oxygen or enriched air as previously described in FIGS. 1-4.

The method includes an air separation unit 55. To supply energy to the air separation unit and prevent the grid electricity supply dependency, the system can include a co-generator facility 54. The co-gen unit produces energy for the air separation unit and, with the turbine tailing hot gases. It produces steam from high quality treated water. The water can be provided from the water treatment plant of an existing prior art EOR facility 57, like SAGD. An air separation facility 55 produces oxygen or enriched air for direct contact reactor 58.

The oxygen or enriched air is injected into high-pressure direct contact steam generator 58, together with water and fuel. The low-quality water contains a residual bitumen emulsion that needs no further treatment. This prevents the need for use of expensive chemicals and facilities for the water purification emulsion separation process as used in the prior art EOR water treatment plant.

The direct contact steam generation facility 58 is constructed in close proximity to an EOR facility 57, like a SAGD facility that includes a water treatment plant for non-direct steam generation equipment (like OTSG). The reject water from the prior art EOR facility is consumed without additional treatment at the new facility 58. The water treatment requirements for the existing prior art EOR water treatment facility can be simplified because the new facility 58 is able to consume oily water, often with an oil emulsion instead of being treated with chemicals to separate the remaining oil (as required for disposal, both by injection wells or by ZLD evaporation facilities).

Facility 58 can also be connected in close proximity to a new EOR facility that does not include a water treatment plant, prior art steam generation facilities or CO-GEN that required treated water. In that case, the steam produced in facility 58 will be the only steam injected throughout the EOR facility. There will not be a flow of blowdown reject water from EOR facility 57 to facility 58. However, there will be a flow of oily bitumen water rejected from the EOR facility during the oil-water separation process.

In areas where availability of carbon-based fuel from an Upgrader or other sources like coal is limited, the fuel used can be substituted by unprocessed bitumen produced by the EOR facility. It is alright for the bitumen to have water and sand impurities.

The waste from ZLD Direct contact steam generator 58 will be in a solid form suitable for landfill disposal, preventing the need for disposal wells or an additional ZLD facility, combined with the prior art EOR facility. Another advantage is that carbon dioxide released to the atmosphere due to ZLD direct contact facility 58 will be minimal because the oil to water ratio is reduced, because of the high thermal efficiency of the process and also because most of the carbon dioxide will be injected directly into the reservoir, where some of it permanently stays underground.

Figure 6:
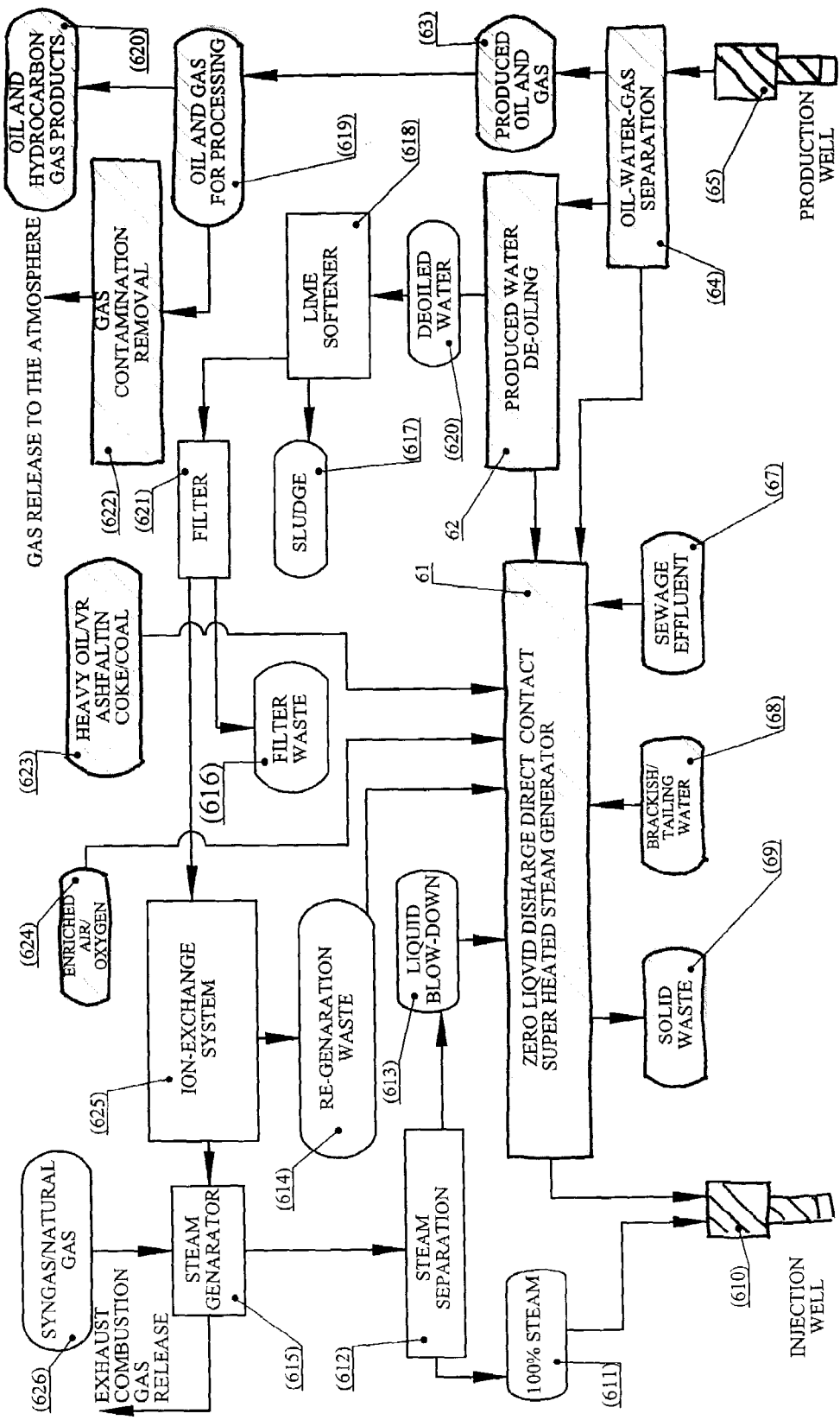
FIG. 6 is a block diagram showing the integration of the direct contact superheated steam generation facility of the present invention, including a prior art "stand alone" SAGD facility where liquid waste produced by the previous art SAGD is consumed by the ZLD direct contact facility.

FIG. 6 is a block diagram showing the direct contact superheated steam generation facility of the present invention 61 as well as a possible integration of the new facility 61 with a prior art EOR like SAGD facility. Liquid waste produced by the SAGD is consumed by the present invention's direct contact process, so the integration becomes a ZLD as a whole. Unit 61 is described by the embodiments in the previous FIGS. 1-4. For better understanding of FIG. 6, the independent, possibly "stand-alone" ZLD direct contact facility portions are marked by a diagonally patterned background, whereas existing prior art EOR facilities have a blank background.

The direct contact ZLD super heated steam generation facility 61 produces a super-heated dry steam and gas mixture for downhole injection for EOR. Oxygen or enriched air 624 is supplied to steam generation unit 61 from an air separation unit. Energy for the air separation unit can be supplied from the grid or any other source. The fuel source for the direct contact steam generator 61 can be liquid hydrocarbon fuel like heavy oil, VR or any available carbon like Petcoke, asphaltin or coal slurry 623. The mixture produced at the EOR production well 65 is separated into gas (mainly carbon dioxide and natural gas), oil and water. The produced water contains heavy oil remains, dissolve minerals, sand and clay. The separated low quality produced water 64 is used for steam generation 61 without any additional treatment. The ability of steam production facility 61 to use such highly contaminated water with no additional treatment is a significant advantage when compared to prior art, as it simplifies the whole process. Additional sources of make-up water can be sewage effluent 67, brackish water and Upgrader tailing water 68. The waste produced by Unit 61 is in a dry solid form suitable for disposal in a landfill. The separated water can include oil, sand and clay impurities and their temperature maybe similar to the well discharge temperature, typically in the range of 150° C. There is no need for cooling the water for further treatment (as in the prior art technologies) thus preventing the heat loss. The produced oil and gas are delivered for further treatment in any type of prior art EOR facility like SAGD or directly to an upgrading facility.

The advantage in integrated facility that includes the direct contact facility and a prior art EOR facility like SAGD is greater than when the two facilities work separately in parallel. The advantage lies in the fact that the new direct contact ZLD facility 61 will simplify the requirements of water treatment plant 62 of the prior art. As well, it will eliminate waste water discharge, while maintaining the advantages of stand-alone, new, direct-contact steam generation like reduction in $CO_2$ emissions.

The produced water, oil and gas that is produced from production well 65, are separated at the water-oil and gas separation unit 64, de-oiled water 620 being supplied to the lime softeners 618 for further treatment. Both prior art water treatment technologies, the softening and the evaporating, require full removal of residual oil. Oily water that might contain sand and clay contamination is delivered directly, without additional treatment, to ZLD direct contact steam generator 61. As a result, the prior art SAGD water treatment plant will be simplified and will require less chemicals and filters. The de-oiled water at 620 is pumped to the prior art lime softeners at 618, where most of the dissolved solids are removed as sludge 617. The soft water is pumped through filters 621. The filtered water is treated in an ion-exchange system 625, where additional waste is generated 614. The treated water is used for generating steam in OTSG or a COGEN 615. Typically, an 80% steam is produced. This wet steam is separated in steam separator 612 to produce 100% steam for downhole injection 611. The liquid blow-down is recycled without additional treatment in the new direct contact steam generator 61. The new direct contact steam 61 is in a dry solid form suitable for landfill disposal as previously described in FIGS. 1-4.

There are advantages of using the present invention or integrating it with existing prior art EOR facilities.

One advantage is the GHG emissions; there will be a reduction in $CO_2$ emissions due to high thermal efficiency. Heat efficiency of the injection is maximized, compared to indirect steam generation methods, because the heat transfer occurs through direct contact and also the combustion gases transfer most of the thermal energy to the formation. The formation acts as a heat exchanger in relation to the combustion gases. This results in higher heat efficiency compared to prior art above-ground, indirect steam production where heat in the combusted gases gets released into the atmosphere.

Another advantage is the reduction of the steam to oil ratio, because of the chemistry of the $CO_2$ in the reservoir. This results in less water and fuel used for generating the heavy oil. This characteristic is well known in oil industry publications and in prior art. For example, U.S. Pat. No. 4,565,249 Pebdani et el issued January 21 1986 and U.S. Pat. No. 5,020,595 Van Slyke et el issued Jun. 4, 1991.

Another advantage is that a portion of the $CO_2$ injected into the formation will remain there permanently.

A further environmental advantage is the use of available low quality wastewater and the use of the prior art reject and oily water. It allows for reduction in the requirements for water-oil separation, as oily water emulsion is used as a water source in a direct contact. There will be no release of reject oily water to the environment or injection into underground water injection wells. The generation of dry solid waste (a "zero" liquid discharged system) can be easily discharged in a landfill.

Another advantage is the use of available low quality fuel, especially the use of petcoke as a fuel. There is a financial advantage in the cost of fuel and an environmental advantage in eliminating the use of natural gas.

For further understanding, the following is an example for the possible implementation of the present invention. An existing prior art SAGD facility produces heavy oil from the tar-sand. Pipelines transfer the produced bitumen to an Upgrader. The SAGD uses water from local water wells (with a water treatment facility based on lime softeners or evaporators). The Upgrader produces significant amounts of solid petcoke, with no commercial value.

The SAGD rejects approximately 10% of low-quality water back to an underground formation through a pipe system and disposal wells. In the Upgrader area, there are wastewater tanks and tailing ponds that are used for holding process water, mostly water with fine clay particles and oil contaminations that cannot be separated or re-used prior to long settling periods.

A possible economic and environmentally-friendly expansion with the present invention can be constructed in two stages.

The first stage will include a direct contact steam generator as described in FIGS. 1-4, which will be built at the SAGD area, together with an air separation unit. This direct contact steam generator will use oxygen or enriched air from the air separation unit. The feed to this system will be low-quality water, including untreated oily water from the existing SAGD facility (as described in FIG. 6) or other available source. The fuel can be any locally-available bitumen produced by the SAGD. The waste from the steam generation process will be in the form of dry solids. The injected product will end up as a mixture of superheated steam, $CO_2$ and other gases at temperatures and pressures similar to those within the existing facility, which is in the range of 250° C. and 2000 Kpa at the wellhead.

The second stage will include integration with the Upgrader as described in FIG. 6. To minimize dependence on electricity supplies, a co-generator can be constructed to provide the energy for the air separation unit. The fuel used in the process may be petcoke from the Upgrader where the produced bitumen from the SAGD facility is treated. Because the pet coke material is located near the upgrader, and not near to the SAGD facility, the pet coke will be ground and mixed with wastewater from the upgrading process, settlement pondwater or any other source. The slurry mixture will be transported using pipes to the direct contact steam generator (See FIGS. 1-4), where the slurry will be injected to react with the oxygen/enriched air to produce steam.

The present invention is a system and method for steam production and its integration into a EOR facility, like SAGD to produce hot, dry steam and gas for down well use. The method is adiabatic. The produced gases maintain most of their pressure and thermal energy throughout the process, up to the point at which they are injected into the reservoir. As result of the low quality water and fuel used, the direct contact steam generation process creates solid waste. The high temperature, pressure separation and removal of solids are important factors for continuous operation. Separation is done when the liquids have already been transferred to gas, so that it is done mainly between the solid phase and the gas phase. It can be continual, or at intervals with pressure drops, to increase evaporation and reduce moisture in the solid waste. The steam and gas purification stages (i.e.—scrubbing remaining solids and corrosive gases) are done in liquid phase under high temperature and pressure, additional water being converted into steam. It is important to minimize the corrosive effects of $CO_2$ in the injection gas and also to minimize the requirements for special corrosion-resistant steel for deep, high-pressure wells. Therefore, the gas mixture is further heated to a temperature in which the steam is in a "dry" super-heated state. This goes down the whole way into the underground formation through the horizontal perforated underground SAGD injection pipe. The steam condensates in the formation, outside of the injection pipe.

The present invention is intended to work with commercially proven underground EOR like SAGD technologies that are commercially proven to be an effective method for the use of steam and stimulating gases (e.g., $CO_2$), to recover the bitumen. Since the present invention does not deal directly with subsurface formation, it can be developed further, engineered and tested remotely away from an oil sand projects. The risk involved decreases as the underground portion of the method is developed and proven.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A method for producing steam and gas mixtures for extracting heavy bitumen, the method comprising the steps of:

mixing fuel with oxidation gases, said fuel being selected from a group consisting of coal, crude oil, vacuum residue, asphaltin and petroleum coke, said oxidation gases being selected from a group consisting of oxygen, oxygen-enriched air, and air;

combusting the mixture in a pressure and temperature controlled environment;

mixing liquid phase water containing organic or inorganic materials, after the step of combusting so as to generate steam and reduce combustion gas temperature;

generating a steam and gas mixture under a controlled temperature by direct contact heat exchange between the combusted mixture and said liquid phase water; and transferring a liquid phase of the mixed and combusted mixture to a gas phase and a solid phase, said gas phase being comprised of steam, carbon dioxide, said solid phase being particles.

2. The method of claim 1, further comprising:
separating solid particles from the gas phase.

3. The method of claim 2, further comprising:
mixing said gas phase with water of saturated temperature and pressure, directly transferring heat of said gas phase to the water to produce a saturated clean wet steam and gas mixture; and
scrubbing any remaining solids from said gas phase into the water.

4. The method of claim 3, further comprising:
separating the saturated water from said gas phase to produce a saturated solid-free steam and gas mixture; and
adding water to the saturate water to maintain the saturated water level.

5. The method of claim 4, further comprising:
sending recycled water with the scrubbed solids and dissolved solids back to the step of combusting, the saturated water carrying the solids being converted to gas.

6. The method of claim 5, wherein said gas phase contains sulfur, the method further comprising:
adding lime stone slurry to the water during said step of solids scrubbing;
reacting lime with the sulfur; and
continuously recycling the generated gypsum solids back to the step of combusting together with the scrubbed solids.

7. The method of claim 4, further comprising:
heating the solid-free saturated steam and gas mixture through heat exchange between the produced gas and mixture of solid particles, to produce a super heated dry, solids free steam and gas mixture flow.

8. The method of claim 7, wherein the pressure of said super-heated dry, solid-free steam and gas mixture flow is between 800 and 4000 Kpa.

9. The method of claim 7, the temperature of said dry steam and gas mixture being between 170° C. and 450° C.

10. The method of claim 7, further comprising:
injecting the superheated dry steam and gas mixture into an underground reservoir through a vertical or horizontal injection well.

11. The method of claim 4, further comprising:
reducing adiabatically pressure of flow of said gas phase to an injection pressure, in order to produce dry steam for injection.

12. The method of claim 1,
wherein said liquid phase water is comprised of disposal water, said disposal water being comprised of oil, clay or sand from an oil and water separation facility of a steam-assisted gravity drainage (SAGD) facility; and
mixing heavy bitumen from the SAGD facility without processing inbetween.

13. The method of claim 1, said step of combustion, further comprising:
supplying fuel from a remote upgrader in the form of a slurry, said fuel being solid petroleum coke or asphaltin;
grinding and mixing said fuel with water to form a pumpable slurry;
pumping the slurry through a pipeline to a direct contact steam generator;
recycling a portion of the water thereof; and
combusting the fuel slurry through the step of combusting.

14. The method of claim 1, further comprising:
producing energy and steam from water by a cogeneration steam plant; and
using energy from the cogeneration steam plant to operate an air separation unit, to generate oxygen or oxygen enriched air as the oxidation gas for use in the combustion chamber; and
using the rejected blow-down water from the cogeneration steam plant as a water source for the direct contact steam generator.

15. A method for producing a steam and gas mixture for extraction of heavy bitumen, the method comprising the steps of:
mixing a fuel with an oxidation gas, said fuel being selected from a group consisting of coal, crude oil, vacuum residue, asphaltin and petroleum coke, said oxidation gas being selected from a group consisting of oxygen, oxygen-enriched air, and air;
partially combusting the mixture in a pressure and temperature controlled environment;
mixing liquid phase water containing organic or inorganic materials, after the step of combusting so as to use combustion temperature energy for steam generation;
generating a steam and gas mixture under a controlled temperature by direct contact heat exchange between the combusted mixture and said liquid phase water;
transferring a whole liquid phase of the mixed and combusted mixture to a syngas and solid phase, said syngas phase being comprised of steam, carbon monoxide, hydrogen and solid particles generated from the step of partially combusting, producing a solid-rich gas phase flow; and
separating the solids from the gas phase flow.

16. The method of claim 15 further comprising:
mixing the gas phase with an oxidation gas, said gas being selected from a group consisting of oxygen, oxygen-enriched air, and air, hydrogen and carbon monoxide converting to carbon dioxide and water while producing heat; and
mixing said gas phase with water of saturated temperature and pressure, heat of said gas phase flow to the water producing a saturated, clean, wet, steam and gas mixture.

17. A system for oil recovery using heat injection, comprising:
a direct-contact steam generator operating on low quality fuel, oxidation gas, and water, said fuel being selected from a group consisting of coal, crude oil, vacuum residue, asphaltin and petroleum coke, said oxidation gas being selected from a group consisting of oxygen, oxygen-enriched air, or air, said water containing organic and inorganic materials, said direct-contact steam generator producing a dry hot mixture of steam, carbon dioxide, flying solids and possibly other gases by direct contact heat exchange between the combusted mixture and the water; and
a solid-gas separation means to separate solids from gas flow using cyclonic separation, centrifugal separation, mesh separation or combinations thereof.

18. The system of claim 17, further comprising:
a vessel partly filled with water of high temperature and pressure, cleansing the gas and steam by mixture with water and scrubbing remaining fine solids particles from said gas to the point where saturated solid-free wet steam and a gas mixture are produced;

a bottom vessel collect and pump system, recycling the concentrated solid rich water from the bottom of the vessel back to the direct-contact steam generator;

a lime slurry injection system incorporated into the scrubbing and steam generation vessel; and a heat exchanger working between the solid-free saturated steam gas mixture and the hot stream leaving the direct contact steam generator, to produce a super heated dry steam and gas mixture, to prevent condensation.

19. The system of claim 18, the hot gases leaving the steam generator being at a temperature of 350-550° C. and pressure of 800 and 4000 Kpa, the solid free steam and gas mixture being at a temperature of 300-450° C. and pressure of 800 and 3800 Kpa.

20. The system of claim 17, further comprising:

an injection well means for injecting the super-heated dry steam and gas mixture into an underground reservoir.

* * * * *